United States Patent
Calistrat

[11] 3,898,813
[45] Aug. 12, 1975

[54] DYNAMICALLY PILOTED GEAR COUPLING

[75] Inventor: Michael M. Calistrat, Sykesville, Md.

[73] Assignee: Koppers Company, Inc., Pittsburgh, Pa.

[22] Filed: July 17, 1974

[21] Appl. No.: 489,401

[52] U.S. Cl. .......................... 64/9 R; 64/6; 74/752 F
[51] Int. Cl. .............................................. F16d 3/18
[58] Field of Search ................... 64/9 R, 9 A, 23, 6; 74/752 F; 192/105 BA

[56] References Cited
UNITED STATES PATENTS

| | | | |
|---|---|---|---|
| 2,510,414 | 6/1950 | Philbrick | 64/9 |
| 2,909,045 | 10/1959 | Borns | 64/9 |
| 3,343,376 | 9/1967 | Carman | 64/9 |
| 3,368,369 | 2/1968 | Kimmel | 64/9 |

Primary Examiner—Samuel Scott
Assistant Examiner—Randall Heald
Attorney, Agent, or Firm—Oscar B. Brumback; Boyce C. Dent

[57] ABSTRACT

A dynamically piloted spool type gear coupling including a spool having external spur gear teeth around its outer periphery and a sleeve surrounding the spool having internal spur gear teeth around its inner periphery in driving engagement with the spool external teeth and a dynamic piloting means within the spool operative upon rotation of the coupling to diametrically expand the spool for maintaining piloted engagement between the external and internal gear teeth. The piloting means preferably comprises a ring of high density material such as lead in a recess in alignment with the external teeth of the spool. The lead ring expands in response to centrifugal force created by rotation of the coupling and bears against the inner periphery of the spool thereby expanding it radially to maintain piloting.

10 Claims, 6 Drawing Figures

3,898,813

DYNAMICALLY PILOTED GEAR COUPLING

BACKGROUND OF THE INVENTION

1. Field of the Invention

This invention relates generally to flexible shaft couplings having meshing gear teeth and more particularly to means for maintaining piloting between the meshing gear teeth during high speed rotation of the coupling.

2. Description of the Prior Art

Flexible gear type couplings have been widely accepted in industry as a successful means for coupling rotational power from a driving shaft to a substantially co-axial driven shaft and particularly where high torque is to be transmitted between shafts that are radially and angularly misaligned. One example of such couplings is shown in Padgett Pat. No. 3,705,502 which illustrates a typical spool type gear coupling (sometimes referred to as marine couplings).

One problem associated with such couplings is that the sleeve member, which includes a ring of internal spur gear teeth, tends to expand because of centrifugal forces caused by high rotation of the coupling. However, the spool carrying the external spur gear teeth in mesh with the internal teeth does not expand as much because of its smaller diameter and usually heavier cross section. Therefore, a gap is created between the meshing external teeth which permits the spool to rotate eccentrically thereby causing an unbalanced condition during rotation of the coupling. This unbalanced rotation causes vibration in the connected machinery and leads to excessive wear of the coupling.

Attempts have been made to overcome the loss of piloting caused by the sleeve expanding more than the spool. For example, Heidrich U.S. Pat. No. 3,521,462 shows a spool which has been axially slotted at circumferentially space intervals to permit the external teeth of the spool member to diametrically expand upon rotation of the coupling. However, the slots tend to weaken the spool and reduce its torque transmitting capacity. Another example of a piloting means is shown in Hoffman U.S. Pat. No. 3,651,662 which includes projections on the internal teeth of the sleeve that bottom on the root spaces between the external teeth on the spool member. But, these projections also move away from the root surfaces as the sleeve expands.

None of the known solutions have successfully overcome the problem of the loss of piloting caused by expansion of the sleeve member during high speed rotation of the coupling. Accordingly, an object of this invention is to provide a means for maintaining piloting between the external and internal teeth of the mating spool and sleeve members of gear type flexible couplings at any rotational speed of the coupling.

SUMMARY OF THE INVENTION

These and further objects and advantages are generally accomplished by providing an annular recess in the bore of the spool member in alignment with the external gear teeth thereon in which there is placed a ring of high density material, such as lead, which tends to expand upon high speed rotation of the coupling thereby diametrically expanding the external gear teeth into piloted engagement with the internal gear teeth of the sleeve member. The lead, because of its high density and low modulus of elasticity tends to expand diametrically from the centrifugal forces created by high rotation of the coupling. Such expansion causes the relatively thin section of the spool member supporting the external gear teeth to expand the few thousands of an inch or less necessary to maintain piloted engagement between the external teeth of the spool and the internal teeth of the sleeve member.

Other high density material may be used in lieu of lead even though they possess a high modulus of elasticity which tends to limit the amount they will expand during rotation of the coupling. The use of such materials will be explained hereinafter.

The above and further objects and novel features of the invention will appear more fully from the following detailed description when the same is read in connection with the accompanying drawings. It is to be expressly understood however, that the drawings are not intended as a definition of the invention but are for the purpose of illustration only.

BRIEF DESCRIPTION OF THE DRAWINGS

In the drawings wherein like parts are marked alike.

DESCRIPTION OF THE PREFERRED EMBODIMENT

Figures 1, 2:
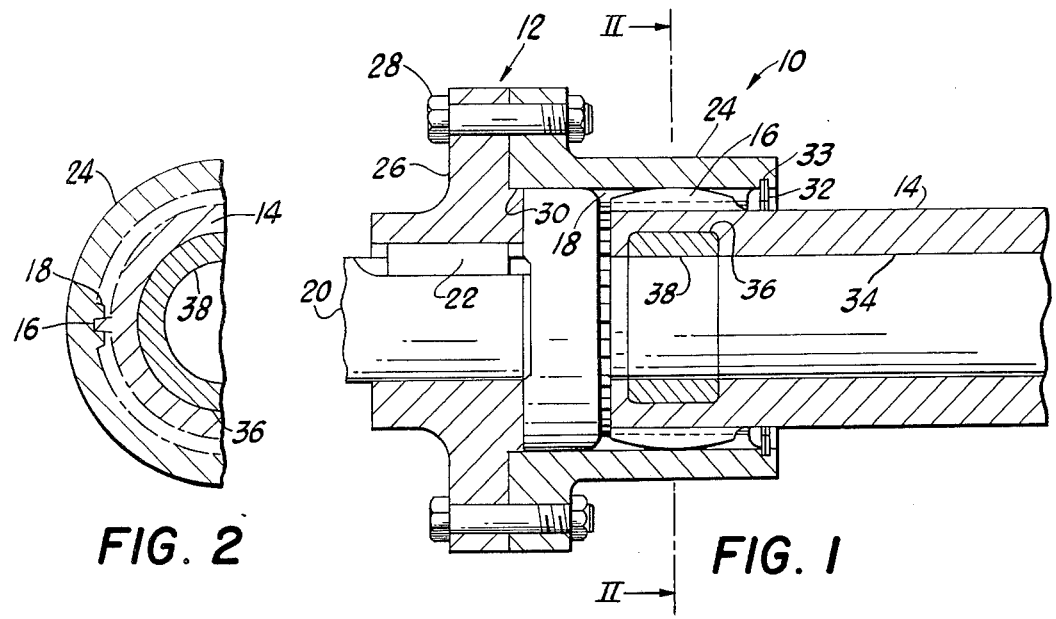
FIG. 1 is a side elevation in cross section showing a spool type flexible gear coupling in which a lead ring is seated in an annular recess in alignment with the external teeth of the spool member.
FIG. 2 is an end view of the coupling of FIG. 1 taken along the line II—II.

The preferred embodiment of the present invention is generally illustrated in FIG. 1 which shows one-half of a gear type spool coupling generally denoted by numeral 10 which is used for connecting a pair of generally co-axially aligned shafts of which one shaft 20 is shown. The opposite right hand end (not shown) is a mirror image of the coupling half shown in FIG. 1. Coupling 10 includes a rigid hub member 12 including a sleeve member 24 surrounding a spool member 14. Spool member 14 includes conventional external spur gear teeth 16 formed thereon at the left end thereof as shown in FIG. 1. These teeth are crowned in the conventional manner to permit the spool member 14 to operate in angular misalignment with respect to hub 12 as well understood by those skilled in the art.

Sleeve member 24 includes conventional internal spur gear teeth 18 formed in its inner periphery that mesh with the external teeth 16 of the spool member 14. Thus, rotation of one of the members results in driven rotation of the other in the well known manner.

Rigid hub member 12 is preferably made in two parts, a sleeve member 24 which includes the internal teeth 18 and a sleeve mounting flange 26 clamped to the sleeve by a fastening means 28 such as the bolts and nuts illustrated in FIG. 1. The mounting flange 26 is secured to shaft 20 by a key 22 in the usual manner. The mounting flange 26 preferably includes a shoulder or rabbet 30 for concentrically seating the sleeve member 24.

After the spool member 14 has been inserted into the sleeve 24, it is retained therein by a conventional Spirolox ring seated in a groove 33 formed in the sleeve 24. The description and operation of the Spirolox ring 32 appears in Carman U.S. Pat. No. 3,343,376. The Spirolox ring is used in the present invention to retain the spool 14 within the sleeve 24 and may also serve as a dam for maintaining a pool of liquid lubricant within the coupling member. Such couplings are usually continuously lubricated in the well known manner.

The spool member 14 includes a bore 34 formed therein in which an annular recess 36 is formed in alignment with the external teeth 16 on the outer periphery of spool member 14. A ring 38, preferably made of elemental lead, is placed in the recess 36. As illustrated in FIG. 1, the lead ring may be formed by centrifugally casting molten lead into the recess 36; however, if desired, the ring 38 may be made of a split lead ring that can be deformed for insertion into recess 36 and thereafter pressed into recess 36. The bore 34 of spool member 14 may also be removed to the left of the ring 38 as viewed in FIG. 1 so that the ring may be inserted directly into the recess from the end of spool member 14. When installed in this manner, an additional means (not shown) is preferably used to maintain the ring 38 in the recess 36.

The sleeve member 24 and spool member 14 are usually made of steel or steel alloys. Steel has an average density of 7.8 grams per cubic centimeter at 20 degrees Centigrade (hereinafter denoted 7.8 g/cm$^3$ at 20°C) and will, when used for coupling hubs and sleeves, expand diametrically from centrifugal forces caused by rotation of the coupling as a function of diameter, mass, and modulus of elasticity. The sleeve member 24 is usually relatively thin in cross section as compared to the cross section of spool member 14. Thus, since the sleeve 24 is acting at a greater radius from the center of rotation, it tends to expand a greater amount during rotation than does the spool member 14. That is, as the coupling is rotated, the sleeve 24 tends to expand a greater amount than spool 14 resulting in a clearance between the internal and external teeth and consequently, a loss of piloting which permits the spool member to rotate eccentrically. Usually, loss of piloting is not significant at speeds below 3500 RPM; however, at speeds in excess of 3500 RPM, loss of piloting becomes a serious problem. Therefore, the density of ring 38 should exceed the density of the material used for making the spool member 14 and sleeve member 24. Thus, the greater mass and low modulus of elasticity of the ring 38, even though acting at a shorter radius than the sleeve member 24, causes the ring member to bear against the recess 36 thereby expanding the spool member a small amount at high rotational speeds thereby maintaining piloting between the external teeth 16 and internal teeth 18. Lead is the preferred material for ring 38 since it has a low modulus of elasticity and a density of 11.34 g/cm$^3$ at 20°C which is substantially greater than the density of steel and steel alloys. Preferably, the ring material should have a density of at least 10.0 g/cm$^3$.

Figures 3, 4, 5, 6:
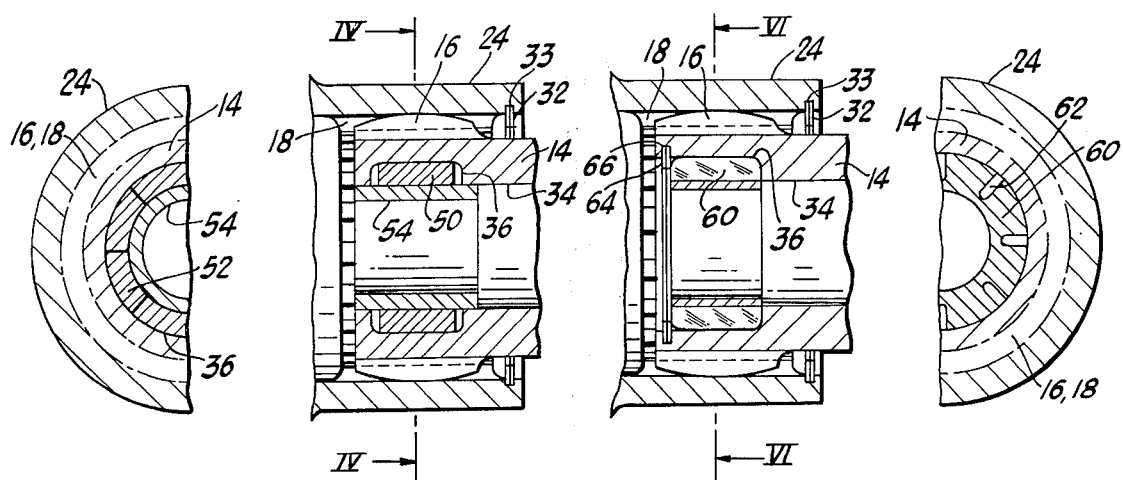
FIG. 3 is a side elevation in cross section of a portion of the coupling of FIG. 1 showing a segmented ring that may be used in place of the lead ring of FIG. 1.
FIG. 4 is an end view of the coupling of FIG. 3 taken along the line IV—IV.
FIG. 5 is a side elevation in cross section of a portion of the coupling of FIG. 1 showing a notched ring that may be used in place of the lead ring of FIG. 1.
FIG. 6 is an end view of the coupling of FIG. 5 taken along the line VI—VI.

Other high density materials such as tungsten, molybdenum, silver, and tantalum may be used. However, such materials usually have a high modulus of elasticity so that they do not readily expand in response to the centrifugal forces found in the coupling during rotation thereof. FIGS. 3 and 4 illustrate an alternate embodiment of the invention in which such other highly dense materials may be used for ring 38 even though they possess a high modulus of elasticity. For example, a plurality of arcuate segments 52 (see FIG. 4) may be used to form a segmented ring 50 as illustrated in FIGS. 3 and 4. Since the ring 50 is formed of several segments, upon rotation of the coupling, each segment will tend to bear upon the recess 36 and thereby diametrically expand the spool member 14 in the area of external teeth 16. Each segment may be easily inserted in recess 36 through bore 34 although one of the segments should have parallel sides (not shown) mating with parallel sides on each adjacent segment to permit insertion of the last segment without interference. The segments may be held in the recess 36 by a tubular member 54 which can be pressed in the inner periphery or bore 34 of the spool member 14 on either side of the recess 36. If desired, segmented ring 50 may also be made of lead.

FIGS. 5 and 6 illustrate still another embodiment of the invention in which the piloting means comprises a notched ring 60 made of a high density material having a high modulus of elasticity. So that the ring 60 will expand diametrically from centrifugal forces, a plurality of slots or notches 62 are circumferentially spaced around the ring as shown in FIG. 6. These notches 62 extend to a depth to provide a thin cross section between the bottom of the notch 62 and the inner periphery of the ring 60. Thus, the thin cross section permits the ring to expand diametrically upon high rotation of the coupling. Although the notches 62 are shown formed from the outer periphery of ring 60 towards the inner periphery thereof, the notches may extend from the inner periphery of ring 60 toward its outer periphery thereby forming a thin cross section of material between the bottom of the notches and the outer periphery of the ring. Ring 60 may also be formed with interdigitally spaced notches of which alternate ones extend from the outer periphery towards the inner periphery and the remaining ones extend from the inner periphery of the ring towards its outer periphery (not shown).

To permit installation of ring 60 in recess 36, the recess extends to the end of the spool member 14 so that ring 60 may be easily inserted in the recess 36 from the end of the spool. The ring 60 may be secured in the recess 36 by a Spirolox ring 64 seated in a groove 66 formed in recess 36 as illustrated in FIG. 5. If desired, notched ring 60 may likewise be made of lead.

Ring 38 in FIG. 1 and the segmented ring 50 illustrated in FIG. 3 have been shown as having an inner diameter substantially equal to the diameter of bore 34 of spool member 14. However, it should be understood that the inner diameter of rings 38 and 50 may be less than the diamter of bore 34 such as shown for the ring 60 in FIG. 5. Likewise, the inner diameter of the ring may be greater than the diameter of bore 34. The actual size of the rings 38, 50 and 60 will depend on the density of the material used to make the rings, the overall size of the coupling in which the rings are to be used and the material of the spool member 14 and sleeve member 24. One skilled in the art can determine the size of the ring needed to cause the spool member 14 to expand diametrically an amount needed to maintain piloting between the external teeth 16 and internal teeth 18 by applying known mathematical formulae to the strength of materials used for the coupling components and the ring and considering the sizes thereof.

In operation, the shaft 20 is rotated by a power source, (not shown) and the torque generated in shaft 20 by the power source is transmitted through the rigid hub member 12 and through the meshing gear teeth 18 and 16 to the spool member 14. The torque is transmitted by the spool member 14 through a similar hub member 12 (not shown) to another shaft (not shown) which may be connected to whatever machinery is to be driven. As the coupling is rotated, the centrifugal forces created in the coupling cause the sleeve 24 to expand. However, the centrifugal forces created in the high density rings 38, 50, or 60 cause the rings to diametrically expand against the recess 36 and consequently expand the spool member 14 an amount sufficient to keep the teeth 16 in piloted engagement with the teeth 18. Since deflection caused by the centrifugal forces is continuous, the spool 14 will continue to expand thereby maintaining piloted engagement of the external teeth 16 with internal teeth 18. Thus, a great advantage of this invention is that the size or rings 38, 50 or 60 need not be selected for a particular speed; piloting will be maintained at any rotational speed of the coupling.

Although this invention has been shown in connection with a gear type spool coupling, it should be understood that it is equally applicable to a half coupling such as where the spool member 14 would be simply connected to another shaft rather than indirectly to a shaft through another half coupling assembly such as shown in FIG. 1.

Thus, the present invention maintains piloting between the meshing gear teeth of the cooperating hub and sleeve members at high rotational velocities which reduces vibration in the machinery connected by the coupling and extends the life of the coupling itself.

Accordingly, the invention having been described in its best embodiment and mode of operation, that which is desired to be claimed by Letters Patent is:

1. A dynamically piloted gear coupling comprising:
   spool means having external spur gear teeth around its outer periphery;
   sleeve means surrounding said spool means and having internal spur gear teeth around its inner periphery in driving engagement with said external teeth; and
   dynamic piloting means within said spool means operative upon rotation of said coupling to diametrically expand said spool means for maintaining piloted engagement between said external and internal gear teeth.

2. The coupling of claim 1 wherein:
   said piloting means comprises a ring of high density material diametrically expandable in response to centrifugal force for expanding said spool means.

3. The coupling of claim 2 wherein:
   said spool means includes an annular recess in its inner periphery in alignment with said external teeth for containing said ring.

4. The coupling of claim 2 wherein:
   said ring is made of a metallic material having a density greater than 10.0 g/cm$^3$ at 20°C.

5. The coupling of claim 2 wherein said ring is made of elemental lead.

6. The coupling of claim 1 wherein:
   said spool means includes an annular recess in its inner periphery in alignment with said external teeth;
   said piloting means comprises a plurality of arcuate segments of high density material forming a substantially continuous ring in said recess; and further including
   retaining means for maintaining said segments in said recess.

7. The coupling of claim 6 wherein said retaining means comprises a tubular member, engageable with the inner periphery of said spool means adjacent to at least one side of said recess, extending within said continuous ring.

8. The coupling of claim 1 wherein:
   said spool means includes an annular recess in its inner periphery in alignment with said external teeth;
   said piloting means comprises a ring, of high density material, in said recess having a plurality of circumferentially spaced and radially extending notches for enabling said ring to diametrically expand in response to centrifugal force for expanding said spool means.

9. The coupling of claim 8 further including axially acting retaining means for maintaining said ring in said recess.

10. The coupling of claim 1 wherein:
    said spool means includes axially spaced first and second sets of external spur gear teeth around its outer periphery and further includes first and second annular recesses in its inner periphery in respective alignment with said first and second sets of external gear teeth;
    said sleeve means comprises first and second sleeve members each including internal spur gear teeth around its inner periphery in respective driving engagement with said first and second sets of external gear teeth; and
    said piloting means comprises a ring of high density material in each of said first and second recesses diametrically expandable in response to rotation of said coupling for expanding each of said first and second sets of external gear teeth into piloted engagement with corresponding ones of said internal gear teeth.

* * * * *